United States Patent [19]

Dean et al.

[11] Patent Number: 4,740,555

[45] Date of Patent: Apr. 26, 1988

[54] MOLDING COMPOSITION WITH ENHANCED WELD-LINE STRENGTH

[75] Inventors: Barry D. Dean, Broomall; Kathleen A. Geddes, West Chester, both of Pa.

[73] Assignee: ARCO Chemical Company, Newtown Square, Pa.

[21] Appl. No.: 935,869

[22] Filed: Nov. 28, 1986

[51] Int. Cl.[4] .............................................. C08L 51/00
[52] U.S. Cl. ...................................... 525/67; 525/148; 525/286
[58] Field of Search .................... 525/67, 148, 468, 69

[56] References Cited

U.S. PATENT DOCUMENTS

| 4,456,732 | 6/1984 | Nambu et al. | 525/67 |
| 4,469,843 | 9/1984 | Lordi | 525/67 |
| 4,493,920 | 1/1985 | Le-Khac | 525/67 |
| 4,551,388 | 11/1985 | Schlademan | 428/355 |

*Primary Examiner*—Theodore E. Pertilla
*Attorney, Agent, or Firm*—Dennis M. Kozak

[57] ABSTRACT

A moldable composition produced by incorporating a macromonomer/alkyl acrylate/glycidyl methacrylate terpolymer into a blend of polycarbonate and a styrenic copolymer is disclosed. The macromonomer/alkyl acrylate/glycidyl methacrylate terpolymer is effective in enhancing the weld-line strength of the molded composition.

11 Claims, No Drawings

MOLDING COMPOSITION WITH ENHANCED WELD-LINE STRENGTH

This invention relates to molding compositions.

In one of its more specific aspects this invention relates to the modification of a moldable composition of a blend of polycarbonate and either a vinyl aromatic/$\alpha,\beta$-unsaturated dicarboxylic anhydride copolymer or a vinyl aromatic/$\alpha,\beta$-unsaturated dicarboxylic anhydride/$\alpha,\beta$-unsaturated dicarboxylic anhydride imide terpolymer by the introduction thereinto of a macromonomer/alkyl acrylate/glycidyl methacrylate terpolymer additive.

Molding compositions of polycarbonates and vinyl aromatic/$\alpha,\beta$-unsaturated dicarboxylic anhydride copolymers or vinyl aromatic/$\alpha,\beta$-unsaturated dicarboxylic anhydride/$\alpha,\beta$-unsaturated dicarboxylic anhydride imide terpolymers are well known. See, for example, U.S. Pat. Nos. 4,469,843 and 4,493,920, the teachings of which are fully incorporated herein. When these prior art molding compositions are molded, the molded product usually evidences poor weldline strength.

The present invention provides a terpolymer which is incorporated into the above molding compostions to enhance the weld line strength of the molded product.

According to this invention, there is provided a terpolymer comprising recurring units of a macromonomer, recurring units of an alkyl acrylate, and recurring units of a glycidyl methacrylate.

According to this invention, there is also provided a moldable compound comprising a matrix resin composition and a terpolymer additive wherein said matrix resin composition comprises a thermoplastic polycarbonate and at least one polymer selected from the group consisting of a vinyl aromatic/$\alpha,\beta$-unsaturated dicarboxylic anhydride copolymer and a vinyl aromatic/$\alpha,\beta$-unsaturated dicarboxylic anhydride/$\alpha,\beta$-unsaturated dicarboxylic anhydride imide terpolymer; and said terpolymer additive is a macromonomer/alkyl acrylate/-glycidyl methacrylate terpolymer.

Also according to the present invention, there is provided a method of producing a moldable compound which comprises incorporating into a matrix resin composition comprising a thermoplastic polycarbonate and at least one polymer selected from the group consisting of a vinyl aromatic/$\alpha,\beta$-unsaturated dicarboxylic anhydride copolymer and a vinyl aromatic/$\alpha,\beta$-unsaturated dicarboxylic anhydride/$\alpha,\beta$-unsaturated dicarboxylic anhydride imide terpolymer, a macormonomer/alkyl acrylate/glycidyl methacrylate terpolymer additive, the additive being present in an amount sufficient to improve the weld line strength of the molded matrix composition.

The matrix resin composition into which the terpolymer additive is incorporated will comprise from about 30 to about 70 weight percent of a thermoplastic polycarbonate and from about 70 to about 30 weight percent of a vinyl aromatic/$\alpha,\beta$-unsaturated dicarboxylic anhydride copolymer. Suitable copolymers will comprise in weight percent, from about 4 to about 30 recurring units of $\alpha,\beta$-unsaturated discarboxylic anhydride and from about 96 to about 70 recurring units of vinyl aromatic monomer. Suitable terpolymers can be prepared by substituting $\alpha,\beta$-unsaturated dicarboxylic anhydride imide for up to 50 percent of the $\alpha,\beta$-unsaturated dicarboxylic anhydride.

In a preferred embodiment of this invention the copolymer or terpolymer employed in the matrix resin composition is rubber modified. The rubber modification is preferably achieved by chemically grafting the copolymer or terpolymer to a rubber or rubber mixture during the polymerization of the copolymer or terpolymer. Suitable rubber modified copolymers or terpolymers will contain up to about 25 weight percent rubber, that is, the rubber will be present in an amount of up to 25 weight percent based on the total weight of the polymer plus the rubber. Any rubber having a glass transition temperature below 0° C. is suitable for use.

Any suitable vinyl aromatic monomer can be used to produce the copolymer or terpolymer employed in the matrix resin composition.

Suitable vinyl aromatic monomers include styrene, alpha-methyl styrene, nuclear methyl styrenes, ethyl styrene, isopropyl styrene, tert butyl styrene, mono-, di, and tribromostyrenes, mono-, di- and trichlorostyrenes, vinyl napthalene and the like and their mixtures. Styrene is the preferred vinyl aromatic monomer.

Any suitable $\alpha,\beta$ ethylenically unsaturated dicarboxylic anhydride can be used to produce the copolymer or terpolymer employed in the matrix resin composition.

Suitable $\alpha,\beta$ ethylenically unsaturated dicarboxylic anhydrides include maleic anhydride, citraconic anhydride, itaconic anhydride, aconitic anhydride, and the like and their mixtures. The preferred anhydride is maleic.

Any suitable $\alpha,\beta$-unsaturated dicarboxylic anhydride imide can be substituted for up to 50% of the total amount anhydride to produce the terpolymer.

Particularly suitable for use are N-aryl-maleimides such as N-phenylmaleimide, N-(4-methyl)phenylmaleimide, N-(4-methoxy)phenylmaleimide, N-(4-bromo)phenylmaleimide, N-(2,4,6-tribromo)phenylmaleimide, and the like, and their mixtures.

Any suitable thermoplastic polycarbonate can be blended with the copolymer or terpolymer to produce the matrix resin composition used in the present invention.

Polycarbonates based on bisphenols having the following general formula are particularly suitable for use:

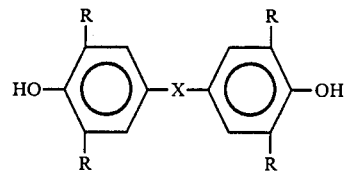

wherein each R separately represents hydrogen, a $C_1$ to $C_4$ alkyl group, chlorine or bromine and wherein X represents a direct bond $C_1$ to $C_8$ alkylene.

Polycarbonates having the above general formula include: 2,2-bis(4-hydroxyphenyl)-propane; 2,2-bis-(3-chloro-4-hydroxyphenyl)-propane, 2,2-bis-(3,5-dimethyl-4-hydroxyphenyl)propane; 2,4-bis-(3,5-dimethyl-4-hydroxylphenyl)-2-methylbutane. Particularly suitable for use in the practice of this invention is 2,2-bis-(4-hydroxyphenyl)-propane.

The macromonomer/alkyl acrylate/glycidyl methacrylate terpolymer additive of this invention will preferably be employed in an add-on amount of from about 1 to about 10 parts per 100 parts of the matrix resin composition.

Preferably, the terpolymer additive will comprise from about 5 to about 35 percent by weight recurring units of macromonomer, from about 64 to about 85 percent by weight recurring units of alkyl acrylate, and from about 1 to about 10 percent by weight recurring unit of glycidyl methacrylate.

Preferred macromonomers are methacrylate terminated or styryl terminated polystyrenes of molecular weight 10,000 to 50,000 as measured by gel permeation chromatography. Suitable terminated polystyrenes are polystyrene, poly(α-methylstyrene), or poly(t-butylstyrene). Suitable macromonomers and methods for their preparation are taught in U.S. Pat. No. 4,551,388, the teachings of which are incorporated herein by reference.

Preferred alkyl acrylate monomers are methyl acrylate, ethyl acrylate, n-butyl acrylate, t-butyl acrylate, 2-ethylhexyl acrylate, 2-ethoxyethyl acrylate, and the like, and their mixtures.

The weight average molecular weight of the macromonomer/alkyl acrylate/glycidyl methacrylate terpolymer as measured by gel permeation chromatography should be within the range of from about 150,000 to about 300,000.

In addition to the above described terpolymer additive, the moldable compounds of this invention can also include other ingrediengts such as extenders, processing aids, pigments, anti-oxidants, stabilizers, mold release agents and the like, for their conventionally employed purpose. Fillers in amounts sufficient to impart reinforcement or property modification can also be added, such as silica, calcium carbonate, talc, mica, processed mineral fibers, titanium dioxide, potassium titanate and titanate whiskers, silicon carbide whiskers, carbon fibers, aramid fibers, glass flakes, glass spheres, chopped glass fibers, and the like, and their mixtures.

The following examples serve to illustrate the preparation of two different macromonomer/alkyl acrylate/glycidyl methacrylate terpolymer additives and their effectiveness in enhancing the weld-line strength of molded compounds.

Evaluation of material properties was performed based on the following ASTM standard tests: tensile strength (D-638), elongation (D-638), notched Izod (D-256), and DTUL (deflection temperature under load, ¼" at 264 psi) (D-648). Gardner falling weight index was established using a 1¼" diameter orifice and an 8 pound ½" diameter weight.

EXAMPLE 1

This example demonstrates the preparation of a macromonomer/ethyl acrylate/glycidyl methacrylate terpolymer.

Ethyl acrylate (81 grams), glycidyl methacrylate (2.8 grams), and 8.4 grams of a methacrylate terminated polystyrene macromonomer of 13,000 molecular weight designated MACROMER® 13K PSMA (commercially available from ARCO Chemical Company) were dissolved in 80 grams of ethyl acetate along with 0.86 gram of VAZO® 67 free radical initiator (commercially available from E. I. DuPont). The reaction was heated at 73° C. for 16 hours. The terpolymer was recovered by devolatilization of solvent and residual monomer in a vacuum oven. The conversion of monomer to polymer was 89% with the terpolymer containing 10.5% macromonomer (as measured by gel permeation chromatography GPC), 3.1% glycidyl methacrylate (as measured by HBr titration), and 86.4% ethyl acrylate. The weight average molecular weight (Mw) of the terpolymer was 247,300 with a polydispersity of 2.7.

EXAMPLE 2

This example demonstrates the preparation of a macromonomer/n-butyl acrylate/glycidyl methacrylate terpolymer.

N-butyl acrylate (75.6 grams), glycidyl methacrylate (8.1 grams), and MACROMER® 13K PSMA (8.7 grams) were dissolved in 80 grams of ethyl acetate along with 0.84 gram of VAZO® 67 free radical initiator. The reaction was heated to 74° C. for 15 hours. The terpolymer was recovered by devolatilization of solvent and residual monomer in a vacuum oven. The conversion of monomer to polymer was 96% with the terpolymer containing. 9.8% macromonomer 8.9% glycidyl methacrylate, and 81.3% n-butyl acrylate. The weight average molecular weight of the terpolymer was 231,900 with a polydispersity of 2.9.

EXAMPLE 3

This example demonstrates the improvement in weld-line strength achieved in a polycarbonate-rubber modified styrene/maleic anhydride copolymer matrix composition using the macromonomer/ethyl acrylate/glycidyl methacrylate (PSMA/EA/GMA) terpolymer of Example 1 and the macromonomer/n-butyl acrylate/glycidyl methacrylate (PSMA/n-BuA/GMA) terpolymer of Example 2.

The polycarbonate-rubber modified styrene/maleic anhydride copolymer matrix composition empolyed was ARLOY® 1100 resin (60% polycarbonate, 40% rubber modified styrene maleic anhydride) commercially available from ARCO Chemical Company.

ARLOY® 1100 resin was separately melt blended with 4.5 phr of PSMA/EAA/GMA and with 4.5 parts of PSMA/n-BuA/GMA at 500° F., specimens were molded, and physical properties and weld-line impact properties were assessed and are shown in the following Table.

TABLE

| Composition | Terpolymer Additive of | | |
| --- | --- | --- | --- |
| | Control | Example 1 | Example 2 |
| ARLOY® 1100 Resin | 100 | 100 | 100 |
| PSMA/EA/GMA (Ex. 1), phr | — | 4.5 | — |
| PSMA/n-BuA/GMA (Ex. 2), phr | — | — | 4.5 |
| Physical Properties: | | | |
| Tensile Strength (psi) | 9010 | 8940 | 8640 |
| Elongation (%) | 79 | 85 | 87 |
| DTUL (°F.) | 235 | 233 | 233 |
| Notched Izod (ft-lbs/in) | 12.1 | 11.4 | 13.5 |
| Gardner Falling Weight Index (in-lbs) | 480 | 480 | 480 |
| Impact Strength (ft-lbs) at 25° F. | | | |
| On weld-line | 15 | 39 | 39 |
| Off weld-line | 34 | 46 | 42 |
| % Retention | 44 | 85 | 92 |
| at 20° F. | | | |
| On weld-line | 3 | 20 | 29 |
| Off weld-line | 10 | 40 | 29 |
| % Retention | 30 | 50 | 100 |

It will be seen from the above that the incorporation of a macromonomer/alkyl acrylate/glycidyl methacrylate terpolymer into a molding composition containing polycarbonate blended with a rubber-modified styrene-maleic anhydride copolymer provides moldable compounds which exhibit enhanced weld-line strength upon molding in comparison with the Control which contained no terpolymer additive. It will be noted that the incorporation of 4.5 parts of the terpolymer of Example 2 into a commercially available blend of polycarbonate and rubber-modified styrene/maleic anhydride copolymer resulted in a 100% retention of weld-line strength at −20° F.

It will be evident from the foregoing that various modifications can be made to this invention. Such however are considered as being within the scope of the invention.

What is claimed is:

1. A moldable blend comprising a matrix resin composition and a terpolymer additive wherein:
   a. said matrix resin composition comprises a thermoplastic polycarbonate and at least one polymer selected from the group consisting of a vinyl aromatic/α,β-unsaturated dicarboxylic anhydride copolymer and a vinyl aromatic/α,β-unsaturated dicarboxylic anhydride/α,β-unsaturated dicarboxylic anhydride imide terpolymer; and
   b. said terpolymer additive is a macromolecular monomer/alkyl acrylate/glycidyl methacrylate terpolymer.

2. The moldable blend of claim 1 in which the polymer employed in the matrix resin composition is chemically grafted to a rubber.

3. The moldable blend of claim 2 in which said rubber has a glass transition temperature of 0° C. or less.

4. The moldable blend of claim 2 in which said rubber is present in an amount of up to 25 weight percent of the total weight of the polymer plus the rubber.

5. The moldable blend of claim 1 in which said matrix resin composition contains from about 30 to about 70 weight percent thermoplastic polycarbonate and from about 70 to about 30 weight percent of said polymer.

6. The moldable blend of claim 1 in which said polymer is a copolymer containing from about 4 to about 30 weight percent recurring units of α,β-unsaturated dicarboxylic anhydride and from about 96 to about 70 weight percent recurring units of vinyl aromatic monomer.

7. The moldable blend of claim 1 in which said polymer is a terpolymer of recurring units of a vinyl aromatic monomer, recurring units of an α,β-unsaturated dicarboxylic anhydride and recurring units of an α,β-unsaturated dicarboxylic anhydride imide.

8. The moldable blend of claim 1 in which said terpolymer additive is employed in an add-on amount of from about 1 to about 10 parts per each 100 parts of said matrix resin.

9. The moldable blend of claim 1 in which said terpolymer contains in weight percent from about 5 to about 35 recurring units of macromolecular monomer, from about 64 to about 85 recurring units of alkyl acrylate and from about 1 to about 10 recurring units of glycidyl methacrylate.

10. The moldable blend of claim 1 in which said macromolecular monomer is a methacrylate or styryl terminated polystyrene.

11. A method of producing a moldable blend comprising melt blending into a matrix resin composition comprising a thermoplastic polycarbonate and at least one polymer selected from the group consisting of a vinyl aromatic/α,β-unsaturated dicarboxylic anhydride copolymer and a vinyl aromatic/α,β-unsaturated dicarboxylic anhydride/α,β-unsaturated dicarboxylic anhydride imide terpolymer, a macromolecular monomer/alkyl acrylate/glycidyl methacrylate terpolymer additive, the additive being present in an amount sufficient to improve the weld-line strength of the molded matrix resin composition.

* * * * *